United States Patent [15] 3,659,273
Knauft et al. [45] Apr. 25, 1972

[54] # ERROR CHECKING ARRANGEMENT

[72] Inventors: Gunter Knauft, Boblingen; Fritz Koederitz, Gechingen; Helmut Palnke, Sindelfingen; Leopold Reichl, Boblingen; Hans H. Lampe, Sindelfingen; Robert Vachenauer, Stuttgart-Feuerbach; Edwin Vogt, Boblingen; Hermann Weber, Sindelfingen, all of Germany

[73] Assignee: International Business Machines Corporation, Armonk, N.Y.

[22] Filed: May 26, 1970

[21] Appl. No.: 40,643

[30] Foreign Application Priority Data

May 30, 1969 Germany ......................P 19 27 549.1

[52] U.S. Cl. ..........................................................340/172.5
[51] Int. Cl. .........................................G06f 3/02, G06f 3/04
[58] Field of Search ..............................................340/172.5

[56] References Cited

UNITED STATES PATENTS

| | | | |
|---|---|---|---|
| 3,343,141 | 9/1967 | Hackl | 340/172.5 |
| 3,387,262 | 6/1968 | Ottaway et al. | 340/172.5 |
| 3,387,276 | 6/1968 | Reichow | 340/172.5 |
| 3,405,395 | 10/1968 | Wallin | 340/172.5 |
| 3,488,634 | 1/1970 | Mager | 340/172.5 |
| 3,510,843 | 5/1970 | Bennett et al. | 340/172.5 |
| 3,518,413 | 6/1970 | Holtey | 340/172.5 |

*Primary Examiner*—Paul J. Henon
*Assistant Examiner*—Paul R. Woods
*Attorney*—Hanifin and Jancin and Delbert C. Thomas

[57] ABSTRACT

This disclosure is for a rearrangement of the input/output controls of a small central processing unit (CPU) to enable interspersed use of the input/output devices by the CPU and by the customer engineer. This configuration allows the engineer to read the status of the devices and to test their functions without interference with the CPU usage of the devices and without shutting down of the system.

3 Claims, 2 Drawing Figures

ERROR CHECKING ARRANGEMENT

OBJECTS

The invention relates to an arrangement for checking the operation of attachments and input/output devices in electronic data processing systems.

With the ever increasing complexity of modern data processing systems, it is becoming more and more difficult to implement the necessary field testing and maintenance work for these systems at a reasonable expenditure of machine time and a minimum of additional hardware.

It is necessary in the smaller systems of this kind to build into the machine, some simple testing and maintenance arrangements, the technical expense and means of which should be kept at a minimum.

The known testing arrangements which essentially consist of plug units which the customer engineer must carry around with him continuously are too time-consuming for test and maintenance work since they require detailed attention. Thus, for example, it is necessary for the performance of these tasks to look for the contact points in the machine as indicated on precise diagrams and to connect to them the plug units for the predetermined tests. These time-consuming preparatory tasks which, by themselves, have nothing to do with the test itself and use up a significant part of the total test and maintenance time. One object of this invention is to provide an inexpensive checking and maintenance arrangement which can be easily operated, is convenient and at the same time is time saving.

For an error checking arrangement for channel attachments and input/output devices in electronic data processing systems, the invention is characterized in that a switching arrangement is included in the bus loop between the central processing unit and the attachments. This bus loop will, in the absence of CONTROL or SENSE instructions in the processor under test, transmit address information from the settable test switches to the address bus loop and will subsequently link the sensed data through the data bus loop to the test and indicator circuits.

It is essential for the invention that all the test circuits normally existing in the machine are used in the present case for indicating the signals supplied by the attachments or for comparing given signal patterns with signals actually occurring in the system and for this purpose, only minor technical alterations and additions need to be made.

The error checking arrangement for attachments and input/output devices in accordance with the invention permits a simple and convenient, yet also, economical checking of the functions described.

The foregoing and other objects, features and advantages of the invention will be apparent from the following more particular description of the invention as illustrated in the accompanying drawings.

Figure 1:
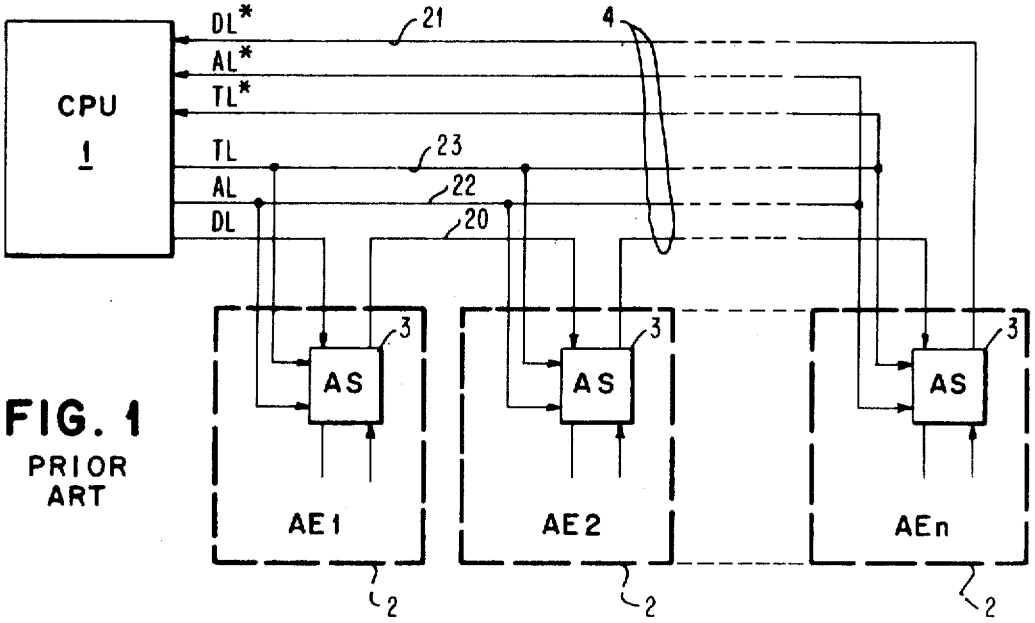
FIG. 1 is a block diagram of a prior art data processing system in which the central processing unit and the attachments for the input/output devices are connected together by means of a data bus loop.

FIG. 1 shows a data processing system which is representative of the systems available in the prior art. The system shown is a schematic diagram of the pertinent parts of a commercial processor sold by the assignee of this application and is commercially identified as the IBM System/360, Model 20. For the purposes of this disclosure, the system is shown as made up of a central processing unit (CPU) 1 and a number of input/output devices of which only the interface attachments (AE 1 to AE *n*) incorporated in the central processing unit are shown. The associated control devices of the central processing unit 1 and the interface attachments 2 for the input/output devices communicate through a bus loop 4. The bus loop 4 consists of DL, the data bus 20, which is looped through the individual attachments 2 via the associated selection circuits (AS) 3 and is led back as DL* bus 21 to the control circuits of the central processing unit 1. Bus loop 4 also includes the AL address bus 22 which is provided for selecting (addressing) the interface attachment 2 of a specific input/output device. For selection, each attachment makes available a number of gates in the selection circuit 3 which together with the clocking signals transferred over TL, the common clocking bus 23, control the data distributions from the attachment 2 to the central processing unit 1 and vice versa. Both the address bus 22 and the clocking bus 23 are led back to the control circuits of the central processing unit as buses AL* and TL*. All the above buses form as already stated, a bus loop.

It has been found that during normal operation of such a data processing system, the communications between the central processing unit 1 and the attachments 2 which communications are initiated by CONTROL and SENSE instructions, require less than 20 percent of the total program time. Therefore, it is possible to slightly modify the existing circuits, lines and buses to enable their alternate use for servicing purposes which will facilitate the work of the customer engineer.

For example, the indicator lamps in the operator control panel which are usually used for displaying the register and storage contents can be utilized for displaying the information exchanged on the bus loop 4 between the central processing unit 1 and the attachments 2.

It is also possible to use the usual address and data configuration switches on the operator control panel to set certain signal configurations at a specific address during communications between the central processing unit 1 and the attachments 2 for implementing a machine stop which retains the data processing system in the state in which it was at the time of the occurrence of the stop signal. This, too, facilitates the test and maintenance work.

Figure 2:
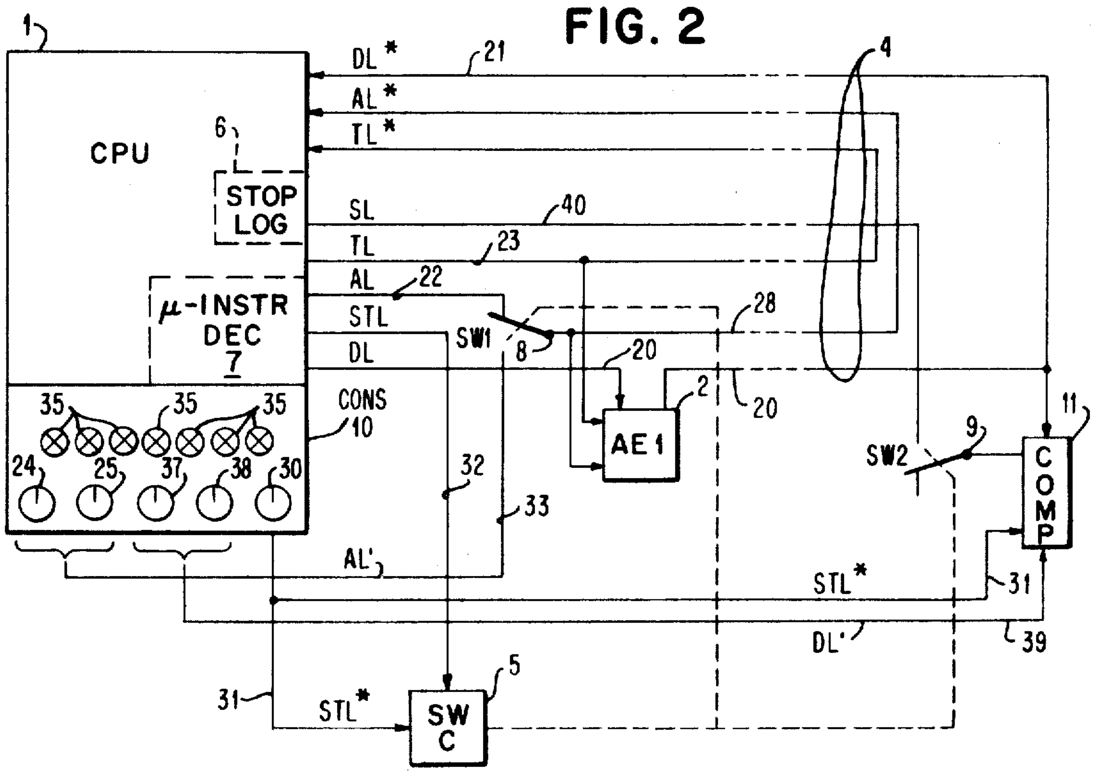
FIG. 2 is a block diagram of a data processing system of the type shown in FIG. 1 and in which the testing arrangements are designed in accordance with the invention.

FIG. 2 shows a block diagram of a data processing system with the modification in accordance with the invention. SW1-switch 8 and SWC, its control circuit 5, are the most important items of the modification. These circuits enable the dynamic display of the signal sequence of certain system elements of the attachments 2, the elements being selected by the address switches 24 and 25 on the operator control panel 10. The contact position of switch 8 is determined by the output signals of this control circuit 5. In the inoperative state, i.e. in the normal position, switch 8 links the outgoing address bus 28 and thus the attachments 2 through their selection circuit 3 (see FIG. 1) with the address bus 22 from the usual micro instruction decoder 7 of the central processing unit 1. In this position of switch 8, the CONTROL and SENSE instructions together with the respective addresses are rendered effective during the normal micro program sequences.

It is to be understood that switch 8 and the later to be described switch 9 together with the switch controls from control unit 5 are indicated as mechanically movable contacts for purposes of illustration only. In practice, such switches may be any of the known fast acting type of electronic switching circuits and the control from unit 5 will be an electronic signal to operate the switches at speeds of the same magnitude as the cycle speed of CPU 1.

For testing and maintenance of the system, the addresses of selected attachments 2 can be set on the operator control panel 10 by means of switches 24 and 25 which results in the selected attachments and their system elements being tested during the times the CONTROL and SENSE instructions are not present on loop bus 4. In addition to setting the addresses by means of the address switches, an operation mode switch 30 must be set. In the position "I/O display", this switch 30 applies a control signal through an STL* line 31 to the switch control 5. If, at the same time, a control signal is emitted through STL line 32 from the micro instruction decoder 7 of the central processing unit 1 to indicate the absence of a CONTROL or SENSE instruction, switch control 5 will actuate switch 8. The latter switch 8 subsequently links AL' bus 33 which carries the address information set on the switches 24 and 25 with the AL* address loop bus 28. In this manner, the attachments 2 and their system elements are manually selected for testing. These circuit arrangements subsequently control attachments 2 to execute simulated SENSE instructions; the result of which is transferred to the central processing unit 1 through bus loop 4 through gate circuits not shown to the indicator lamps 35 of the operator control panel 10.

The lamp display 35 enables the customer engineer to readily identify faulty circuits.

The test circuit in accordance with the invention also permits stopping the machine at a predetermined address upon the occurrence of a certain bit configuration on the DL* data bus 21 of bus loop 4. For this purpose, the required address is set by means of the panel switches 24 and 25. Moreover, panel switches 37 and 38 are used for setting the bit configuration which is to initiate a machine stop. To provide a stop control, a compare circuit 11 is provided which receives the bit configuration set on the above switches 37 and 38 on the one input and the information carried on the data bus DL* on the other.

In this instance, too, testing is only permissible during the normal operation of the data processing system when there are no SENSE or CONTROL instructions present on the loop bus 4 and control can be effected by the same switch elements 24, 25 and 30 as are used for controlling the dynamic display. This indicates that the control device 5 for controlling switch 8 can also be employed for controlling a switch 9 to provide a stop signal to CPU 1. Control device 5 for operating switches 8 and 9 receives its control signals from the micro instruction decoder 7 through STL line 32 on the one input to determine that the switches 8 and 9 are only changed over when no signals of CONTROL or SENSE instructions are present on loop bus 4 and on the other input from the operation mode switch 30 which for this purpose must be set to the position "I/O status stop". The signal supplied by this switch in the said position is also transferred through STL* line 31 to the compare circuit 11 resulting in the latter being rendered effective.

During the normal operation of the data processing system, switch 9 is in the open circuit contact position shown in FIG. 2 which constitutes the normal position for this switch. This prevents output signals from being transferred to the stop logic 6 in the central processing unit 1 through the stop line 40. Only after switch 9 has been set to its closed circuit position and when the signals applied to the upper and lower inputs on bus lines 21 and 39, respectively, of the compare circuit 11 are identical, is an output signal applied to stop line 40 which transmits this signal to the stop logic. This results in the machine being stopped and the machine state, mainly that of the bistable switch elements, being retained so that faulty circuits, if any, may be readily localized by the customer engineer.

The bus arrangement in accordance with the invention permits the communication between the central processing unit, the attachments for the input/output devices and the input/output devices to be readily and conveniently checked. Multi-purpose use of the loop bus and of the circuits related to its function ensures a very economical solution to the problem of implementing the test functions described with only a few circuit modifications being required.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system of the type having a central processing unit with a plurality of attachment control units for input/output devices connected thereto by a common address bus and a common data bus, said central processing unit also including an operator control unit, an instruction decoding device to apply signals to said buses and a system stopping control, the combination of a second address bus controlled by settable members on said operator control unit and settable to the address of one of said attachment control units, a switch to connect the common address bus to either said central processing unit or to said second address bus and a switch control unit responsive to the position of another settable member on said operator control panel and to said instruction decoding device when input/output control instructions are not being decoded to operate said switch from the normal position connecting said common address bus to said instruction decoding device to a test position connecting said common address bus to said second address bus.

2. The processing system as set out in claim 1 including a set of indicators at said operator control unit and circuits in said central processing unit responsive when said input/output instructions are not be decoded to information on said common data bus to selectively operate said indicators to indicate the data received from an addressed one of said attachment control units.

3. A data processing system of the type set out in claim 1 in which said central processing unit includes a stop control settable by a control signal, a comparing device to receive the data on said common data bus, other settable devices on said operator control unit to transmit to said comparing device a desired data combination and a circuit energized when said instruction decoding device does not decode selected input/output instructions to activate said comparing device and a switch closed by said switch control unit to connect the output of said comparing device as a control signal to said stop control.

* * * * *